July 4, 1950      G. J. G. NICHOLSON, JR      2,513,583
SYSTEM FOR MATCHING CONDUCTOR CABLES
Filed July 3, 1948
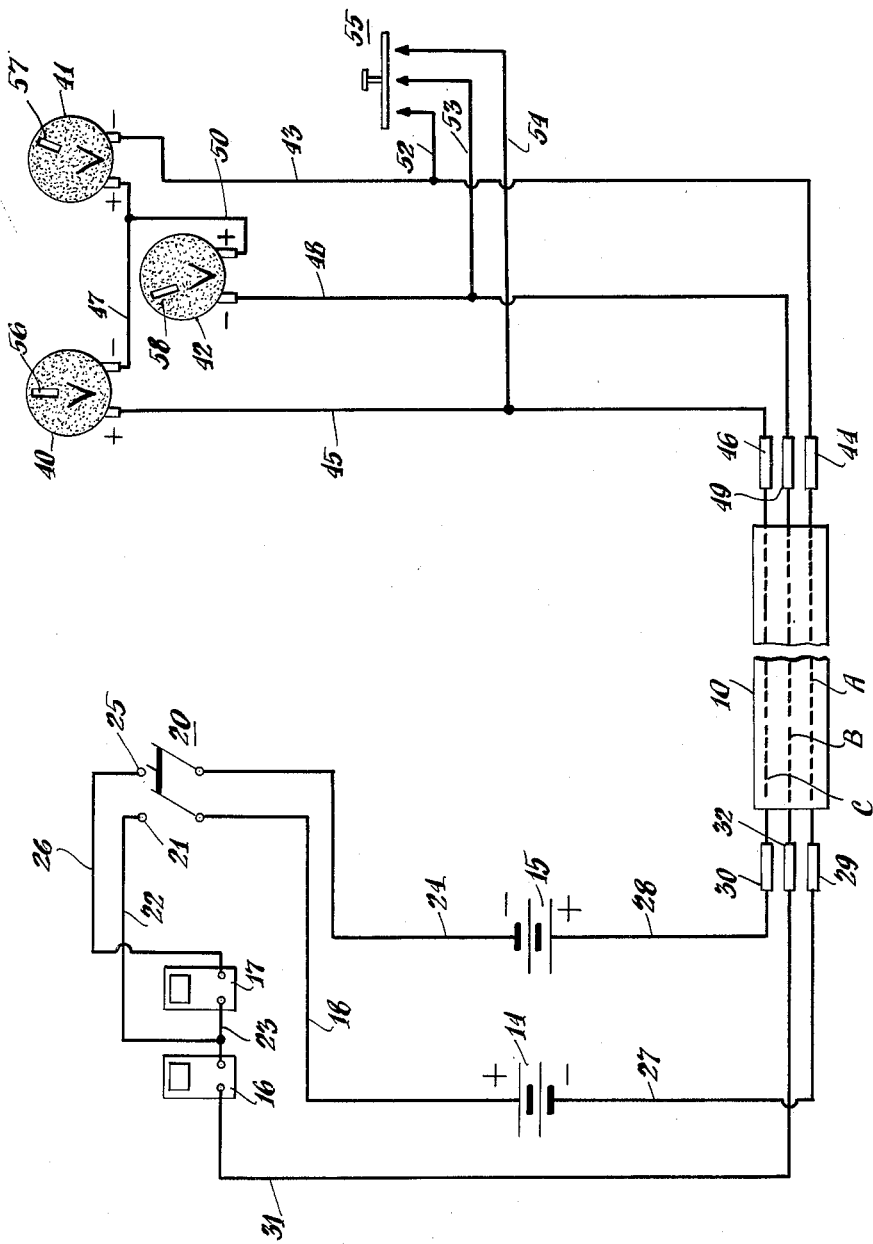
INVENTOR.
George J. G. Nicholson, Jr.
BY
Robert S. Dunham
ATTORNEY Patented July 4, 1950

2,513,583

UNITED STATES PATENT OFFICE 2,513,583

SYSTEM FOR MATCHING CONDUCTOR CABLES

George J. G. Nicholson, Jr., Roslyn, N. Y.

Application July 3, 1948, Serial No. 36,981

4 Claims. (Cl. 177—311)

1

This invention relates to a system for testing conductor cables and more particularly to a system or apparatus for identifying the individual conductors at the two ends of an open or dead three-conductor cable.

An object of the invention is to provide a system of the above type which may be operated by a single individual.

Another object is to provide a system of the above type which provides means for identifying the conductors and also for testing for defects in the cable.

Another object is to provide a system of the above type which includes signal-back means for the forward operator to signal to the rear operator when the test is completed.

Another object is to provide a system of the above type which is simple and rapid in operation.

Various other objects and advantages will be apparent as the nature of the invention is more fully disclosed.

In one embodiment of the invention there is provided a voltage supply unit containing two sets of batteries and two indicators interconnected in the circuit to be described to three leads having clips for attachment to the ends of the conductors of the cable to be tested and arranged to apply predetermined voltages across respective pairs of the conductors. The indicators are so connected in series with the batteries that a short circuit between any two of the conductors of the cable will cause one or the other or both of the indicators to be actuated, and the selective actuation of the indicators determines the pair of conductors which are shorted.

At the remote end of the cable a measuring unit is provided which comprises three voltmeters which are interconnected in the manner to be described to measure the voltages across the respective pairs of conductors. The voltmeters are connected to three leads which are also provided with clips for attachment to the ends of the individual conductors of the cable being tested. The clips of the measuring unit are marked to correspond to the clips of the supply unit above described.

When the clips of the voltage supply unit are connected to the proper conductors of the cable the three voltmeters register predetermined voltages. When any of the connections are reversed, one or more of the voltmeters will fail to register the proper voltage. Hence when the three voltmeters all register the proper voltages,

2 the clips of the measuring unit are properly connected and the ends of the cable conductors may be appropriately marked for identification.

The above described operation may be effected by a single operator by first attaching the clips of the voltage supply unit to one end of the cable and then proceeding to the other end of the cable and attaching the clips of the measuring unit, while noting the indications of the voltmeters. However, if an operator is located at both ends of the cable the forward operator may wish to signal back when he has made the proper identification of the conductors. For this purpose a short circuiting switch is provided in the measuring unit which is connected to short circuit the cable conductors. A signal back is effected by closing the short circuiting switch which energizes the indicators in the supply unit.

The novel features which are characteristic of this invention will be better understood by referring to the following description, taken in connection with the accompanying drawing in which a specific embodiment thereof has been set forth for purposes of illustration.

The single figure of the drawing is a schematic diagram illustrating a system embodying the present invention.

Referring to the drawing more in detail, the system is shown as applied to the testing of a cable 10 having three individual conductors A, B and C. The cable may be of considerable length.

The voltage supply unit at one testing station is shown as comprising a pair of batteries 14 and 15, each of which may comprise a pair of standard dry cells, and a pair of indicators, such as buzzers 16 and 17. The positive terminal of the battery 14 is connected by a lead 18 to one pole of a double-pole switch 20, the corresponding contact 21 of which is connected by a lead 22 to a lead 23, the ends of which are connected to one side of each of the indicators 16 and 17. The negative terminal of the battery 15 is connected by a lead 24 to the other side of the double-pole switch 20, the corresponding contact 25 of which is connected by a lead 26 to the other side of the indicator 17. The negative terminal of the battery 14 and the positive terminal of the battery 15 are connected respectively by leads 27 and 28 to clips 29 and 30. The second side of the indicator 16 is connected by a lead 31 to a clip 32. The clips 29, 32 and 30 are preferably of the spring type and are adapted to be attached temporarily to the ends of the respective conductors A, B and C of the cable 10.

The clips 29, 32 and 30 may be marked A, B and C respectively, for identification purposes.

The measuring unit comprises voltmeters 40, 41 and 42. The negative side of the voltmeter 41 is connected by a lead 43 to a clip 44. The positive side of the voltmeter 40 is connected by a lead 45 to a clip 46. The positive side of the voltmeter 41 is connected to the negative side of the voltmeter 40 by a lead 47. The negative side of the voltmeter 42 is connected by a lead 48 to a clip 49 and its positive side is connected by a lead 50 to the lead 47 above mentioned. The clips 44, 49 and 46 are similar to the clips 29, 32 and 30 and are adapted to be connected to the ends of the conductors A, B and C in the cable 10. The clips 44, 49 and 46 may be marked, respectively, A, B and C for identification purposes.

The leads 43, 48 and 45 are connected by leads 52, 53 and 54, respectively, to the contacts of a short circuiting switch 55 which is normally in open position.

The voltmeters 40, 41 and 42 are of the direct current type, each having a pointer, not shown, which is adapted to swing over a scale from left to right as seen in the figure to indicate the voltage applied thereto. In order to simplify the reading of the voltmeters, the front glass of each voltmeter is provided with an opaque coating or shield having a window 56, 57 and 58, respectively, at the position to be occupied by the respective pointers when the various clips are properly connected. Hence in reading the voltmeters it is only necessary to observe whether or not all three pointers are visible through their respective windows.

In the operation of this device the switch 20 is closed and the clips 29, 32 and 30 are attached, respectively, to the ends of the conductors A, B and C in the cable 10. It will now be noted that the battery 14 and indicator 16 are connected in series across conductors A and B by a circuit including clip 29, lead 27, battery 14, lead 18, switch 20, leads 22 and 23, indicator 16, lead 31 and clip 32. The circuit of indicator 16 is completed in the event of a short between the conductors A and B. Normally, however, the voltage of the battery 14 is applied across the conductors.

The indicators 16 and 17 are both connected in series with the battery 15 across the conductors B and C through a circuit extending from clip 30, lead 28, battery 15, lead 24, switch 20, lead 26, indicator 17, lead 23, indicator 16, and lead 31 to clip 32. Hence, if there is a short between the conductors B and C the indicators 16 and 17 will both operate from the battery 15. If the conductors B and C are open circuited at the far ends, however, the voltage of the battery 15 is applied thereto.

The indicator 17 is connected in series with the batteries 14 and 15 across the conductors A and C by a circuit extending from the clip 29, lead 27, battery 14, lead 18, switch 20, leads 22 and 23, indicator 17, lead 26, switch 20, lead 24, battery 15, and lead 28 to clip 30. Hence, if there is a short between the conductors A and C the buzzer 17 will be operated by both batteries 14 and 15. If the conductors are open circuited at the far end, however, the combined voltages of the batteries 14 and 15 will be applied thereto.

Referring now to the measuring unit, the operator at the far end of the cable 10 attaches the clips 44, 49 and 46 to the respective conductors A, B and C, noting the readings of the three voltmeters and interchanging the connections until the voltmeters all indicate the correct voltages and the points are visible through the various windows 56, 57 and 58. When this occurs the clips 44, 49 and 46 will be connected respectively to conductors A, B and C, and the voltages are applied to the respective voltmeters as follows: The voltmeters 40 and 41 are connected in series across the conductors A and C by a circuit including the clip 44, lead 43, voltmeter 41, lead 47, voltmeter 40, lead 45 and clip 46. Since conductor A is negative with respect to the conductor C the polarity is correct to apply a positive voltage equal to the sum of the voltages of the batteries 14 and 15 to the voltmeters 40 and 41.

Voltmeters 41 and 42 are connected in series between the conductors A and B through a circuit including the clip 44, lead 43, voltmeter 41, leads 47 and 50, voltmeter 42, lead 48 and clip 49. The voltage of the battery 14 is thus applied across the two voltmeters 41 and 42. However, since conductor A is negative with respect to conductor B, this voltage is added to the voltage supplied to the voltmeter 41 through the previously described circuit but appears as a negative voltage across the voltmeter 42.

The voltmeters 40 and 42 are connected in series between the lines B and C through a circuit including the clip 46, lead 45, voltmeter 40, leads 47 and 50, voltmeter 42, lead 48 and clip 49. Hence the voltage of the battery 15 is applied across these two voltmeters and since the conductor C is positive with respect to conductor B this voltage appears as a positive voltage at both voltmeters, being added to the first voltage across the voltmeter 40 and subtracted from the first voltage across the voltmeter 42. Each voltmeter accordingly registers the combined effect of the voltages across two pairs of conductors and the reading of one or more of the voltmeters will be changed when any of the connections are reversed. Hence it is only when the clips 44, 49 and 46 properly identify the conductors A, B and C that each of the voltmeters registers its predetermined voltage.

When the operator has obtained the correct reading the ends of the conductors A, B and C may be properly marked and, if a second operator is stationed at the voltage supply unit the second operator may be advised of the identification of the conductors in the cable 10 by a signal. The signal may be rendered by momentarily closing the switch 55 to short circuit the conductors A, B and C and actuate the indicators 16 and 17 in the manner previously described.

It is to be noted that in the above system a short circuit between any of the pairs of conductors would change the readings of the voltmeters even though the indicators 16 and 17 were not employed. Likewise an open circuit in any of the conductors or a low voltage from the batteries 14 and 15 would result in an improper reading. Hence correct readings on the three voltmeters indicate that the batteries 14 and 15 are of the correct voltage, that the cable is not defective and that the conductors have been properly identified.

The indicators may of course be omitted if they are not required either for signal back purposes or for indication of a short circuit and are primarily intended for use when two operators are employed. Such indicators have been shown as buzzers but other audible or visible devices may be used, if desired.

It is to be understood that the various connections may be altered to apply different voltages to the various pairs of conductors, and that a representative circuit has been shown merely for purposes of illustration. Also various changes and modifications may be made as will be readily apparent to a person skilled in the art and without departing from the scope of the present invention.

What is claimed is:

1. A system for testing three conductor cables, comprising a pair of voltage sources, three voltage supply leads to be connected to one end of the respective cable conductors, means connecting said sources individually across two pairs of said leads and in series across the third pair of said leads, voltage measuring leads to be connected to the other end of the respective cable conductors, three voltmeters, and means connecting a different pair of said voltmeters in series across the respective pairs of measuring leads.

2. A system for testing three conductor cables, comprising a pair of voltage sources, three voltage supply leads to be connected to one end of the respective cable conductors, means connecting said sources individually across two pairs of said leads and in series across the third pair of said leads, voltage measuring leads to be connected to the other end of the respective cable conductors, three voltmeters, and means connecting a different pair of said voltmeters in series across the respective pairs of measuring leads with one voltmeter reversed in at least one of said connections so that the voltages therein are opposed and the voltages in the other voltmeters are additive.

3. A system as set forth in claim 1 in which said voltmeters are of the type having swinging pointers and a shield is provided for each voltmeter having a window to expose said pointer only when in a predetermined position.

4. A system for matching connections at the ends of a three-conductor cable, comprising two sources of voltage, three voltage supply leads to be connected individually to the respective conductors of a three-conductor cable, means connecting said sources individually across two pairs of said leads and in series across the third pair of said leads, current conducting leads to be connected individually to the other ends of the respective conductors of the three-conductor cable, meters for measuring current flow, means connecting one side of each of said meters to different ones of said current conducting leads, and means connecting the other side of each of said meters to each other so that when properly matched voltage supply and current conducting leads are connected in series by the conductors of the three conductor cable the meters simultaneously give predetermined indications.

GEORGE J. G. NICHOLSON, Jr.

REFERENCES CITED

The following references are of record in the file of this patent:

UNITED STATES PATENTS

| Number | Name | Date |
|---|---|---|
| 2,151,976 | Koster | Mar. 28, 1939 |
| 2,366,789 | Horham | Jan. 9, 1945 |